(12) United States Patent
Masson et al.

(10) Patent No.: US 12,166,224 B2
(45) Date of Patent: Dec. 10, 2024

(54) METHOD FOR ASSEMBLING A BATTERY (71) Applicant: COMMISSARIAT A L'ENERGIE ATOMIQUE ET AUX ENERGIES ALTERNATIVES, Paris (FR)

(72) Inventors: Olivier Masson, Grenoble (FR); Michel Bel, Grenoble (FR); Dimitri Gevet, Grenoble (FR)

(73) Assignee: COMMISSARIAT A L'ENERGIE ATOMIQUE ET AUX ENERGIES ALTERNATIVES (FR)

( * ) Notice: Subject to any disclaimer, the term of this patent is extended or adjusted under 35 U.S.C. 154(b) by 839 days.

(21) Appl. No.: 17/051,319

(22) PCT Filed: Apr. 30, 2019

(86) PCT No.: PCT/FR2019/051000
§ 371 (c)(1),
(2) Date: Dec. 29, 2020

(87) PCT Pub. No.: WO2019/211555
PCT Pub. Date: Nov. 7, 2019

(65) Prior Publication Data
US 2023/0139997 A1    May 4, 2023

(30) Foreign Application Priority Data
May 3, 2018 (FR) ...................................... 1853812

(51) Int. Cl.
*H01M 50/20*      (2021.01)
*H01M 50/213*     (2021.01)

(52) U.S. Cl.
CPC ......... *H01M 50/213* (2021.01); *H01M 50/20* (2021.01)

(58) Field of Classification Search
CPC ..................................................... H01M 50/20
See application file for complete search history.

(56) References Cited

U.S. PATENT DOCUMENTS 8,920,955 B1    12/2014    Chuang et al.
2014/0065455 A1   3/2014    Chuang et al.
(Continued)

FOREIGN PATENT DOCUMENTS

CN    205231143 U    5/2016
JP    H06-260173 A   9/1994
(Continued)

OTHER PUBLICATIONS

French Search Report for Application No. FR1853812, dated Dec. 5, 2018, pp. 1-2.
(Continued)

*Primary Examiner* — Barbara L Gilliam
*Assistant Examiner* — Jordan E Berresford
(74) *Attorney, Agent, or Firm* — Lerner David LLP (57) ABSTRACT

A method for assembling a battery including:
providing an end plate having at least one through cell for an accumulator and at least one adhesive injection orifice distant from the cell, the adhesive injection orifice being in fluidic communication via a supply channel with a recess of an inner wall of the cell,
placing the accumulator in the cell,
injecting adhesive through the injection orifice, the adhesive flowing in the channel up to the recess, the accumulator being bonded to the end plate by the adhesive contained in the recess.

11 Claims, 6 Drawing Sheets

(56) References Cited

U.S. PATENT DOCUMENTS

2016/0149169 A1     5/2016  Okura
2017/0162922 A1     6/2017  Sumpf, Jr. et al.
2018/0131028 A1*    5/2018  Offutt .................. H01M 50/20
2018/0366701 A1*   12/2018  Morimitsu ........ H01M 10/0422

FOREIGN PATENT DOCUMENTS

JP          2016207494 A        12/2016
JP          2017079184 A   *     4/2017
JP          2019179856 A        10/2019

OTHER PUBLICATIONS

International Search Report for Application No. PCT/FR2019/051000, mailed Jul. 24, 2019, pp. 1-2.

* cited by examiner

METHOD FOR ASSEMBLING A BATTERY

CROSS-REFERENCE TO RELATED APPLICATIONS

The present application is a national phase entry under 35 U.S.C. § 371 of International Application No. PCT/FR2019/051000 filed Apr. 30, 2019, which claims priority from French Patent Application No. 1853812 filed May 3, 2018, all of which are hereby incorporated herein by reference.

FIELD OF THE INVENTION

The present invention relates to a method for assembling a battery, as well as a battery obtained by said method.

PRIOR ART

To manufacture a battery, it is often necessary to mechanically connect several accumulators to each other, in order to confer sufficient rigidity to the assembly to withstand the mechanical loads undergone by the battery during the manufacture, transport and use thereof.

It is known to mount accumulators in a frame which is then closed by screwing, clipping or soldering. In this case, it is the closing of the frame that ensures the fixing of the accumulators and their maintaining over time.

A known alternative consists in bonding the accumulators together, either directly or through an end plate which has cells each intended to receive an accumulator. The first solution has the advantage of lightness, since no structural part is added. Conversely, the second solution has a mechanical strength much greater than the first, because the end plate which serves as mechanical support is dimensioned to withstand the environment of the battery.

In the case where the battery is assembled by bonding of the accumulators in such an end plate, two possibilities mainly exist for applying the adhesive. In a first case, the adhesive is applied on the accumulators, then they are inserted into a respective cell of the end plate. In a second case, the adhesive is applied on the wall of the cells, then the accumulators are inserted into their respective cells. In both cases, there exists an important risk of pollution of the zones of the accumulators which must remain completely free of adhesive, notably the zones of electrical contact which must remain clean to ensure low electrical resistance between the components.

Furthermore, such a bonding method lends itself poorly to automation, such that it is costly to implement on the industrial scale.

Moreover, such a bonding method is liable to trap air at the level of the cordon of adhesive, between the accumulator and the end plate. Yet, in the case of a battery for aerospace applications, the battery is subjected to important pressure variations. The air subjected to such pressure variations is liable to generate a sudden breakage of the mechanical connection between the accumulator and the end plate, leading to a separation of the accumulator and to a loss of functionality of the battery.

DESCRIPTION OF THE INVENTION

An aim of the invention is to overcome the aforesaid drawbacks and to design a method for assembling a battery which avoids the pollution of the electrical contact zones by the adhesive, and which can be automated.

To this end, the invention proposes a method for assembling a battery characterised in that it comprises:
- the provision of an end plate comprising at least one through cell for an accumulator and at least one adhesive injection orifice distant from the cell, in fluidic communication via a supply channel with a recess of the inner wall of the cell,
- the placing of the accumulator in said cell,
- the injection of adhesive through the injection orifice, the adhesive flowing in the channel up to the recess, the accumulator being bonded to the end plate by the adhesive contained in said recess.

The adhesive may be injected into the orifice by a cannula connected to an adhesive injection pump.

Advantageously, the pump is controlled to inject a determined dose of adhesive into the orifice.

The cannula is advantageously actuated by a robot.

According to an embodiment, the cannula has a conical tip and the adhesive injection orifice has a chamfered input portion able to guide the insertion of the end piece of the cannula into the orifice.

Preferably, the dimensions of the orifice and the cannula are chosen to ensure leak tightness between the cannula and the orifice when the end piece is inserted into the orifice.

According to an advantageous embodiment, a clearance is allowed between the accumulator and the inner wall of the cell so as to ensure fluidic communication of the recess with the exterior of each side of the end plate, to enable the evacuation of air expelled by the adhesive during injection.

According to an embodiment, each cell of the end plate comprises at least two recesses, each recess being connected by a respective supply channel to a distinct respective adhesive injection orifice, such that each accumulator is bonded to the end plate through the adhesive contained in each of said recesses.

According to an embodiment, the assembly comprises the bonding of at least two accumulators in the end plate in two adjacent cells of the end plate, the adhesive injection orifice being in fluidic communication with a recess in the inner wall of each cell via a respective supply channel, such that during the injection of adhesive into said orifice, the adhesive flows into each supply channel up to a respective recess.

Advantageously, the dose of adhesive injected into the orifice is adjusted as a function of the number of channels supplied by said orifice.

According to an embodiment, during the injection of the adhesive, the ends of the accumulators are aligned by an alignment tool on one side of the end plate.

Another object of the invention relates to an end plate enabling the implementation of said method. Said end plate makes it possible to mechanically connect at least two accumulators of a battery, and comprises at least one through cell suited to receiving an accumulator and at least one adhesive injection orifice distant from the cell, in fluidic communication via a supply channel with a recess of the inner wall of the cell.

Advantageously, the adhesive injection orifice has a blind end, the supply channel extending between a side window of the orifice and the recess in the inner wall of the cell.

The adhesive injection orifice advantageously comprises a chamfered input portion.

According to an embodiment, the end plate comprises a plurality of cells arranged in a staggered manner.

According to another embodiment, the end plate comprises a plurality of cells aligned in the form of lines and columns.

Advantageously, the end plate comprises at least one orifice arranged at equal distance from a group of adjacent cells, and a plurality of supply channels fluidically connecting said orifice to a respective recess in the wall of each cell.

The invention also relates to a battery assembled by the aforementioned method. Said battery comprises a plurality of accumulators mechanically connected to each other by an end plate such as described above, each accumulator being bonded in a cell of the end plate by an adhesive contained in at least one recess of each cell.

According to an embodiment, each accumulator is provided with an electrically insulating sheath in contact with the adhesive contained in each recess of the cell.

BRIEF DESCRIPTION OF THE FIGURES

Other characteristics and advantages of the invention will become clear from the detailed description that follows, with reference to the appended drawings, among which.

Identical reference signs from one figure to the other designate identical elements or elements fulfilling the same function.

DETAILED DESCRIPTION OF EMBODIMENTS OF THE INVENTION

The present invention relates to the assembly of a battery based on any type of electrochemical accumulator, that is to say for example of lithium-ion, nickel-cadmium (NiCd), nickel-metal hydride (NiMH) type, etc.

Such a battery is notably intended to be used in aerospace applications, notably to be carried on board a satellite. The battery is thus subjected to important vibratory conditions and to high pressure variations, which requires high mechanical strength.

To form the battery, each accumulator is bonded in an end plate, inside a respective cell.

The end plate comprises two main faces comprising a plurality of through cells extending along an axis not parallel to said main faces. According to an embodiment, the end plate may have a parallelepiped shape, the axis of the cells then advantageously being perpendicular to the main faces of the end plate.

The height of the end plate (that is to say the distance between the main faces, which is for example of the order of 20 mm) being less than the height of each accumulator, the accumulator may extend beyond one or two main faces of the end plate. The inner wall of each cell comprises at least one recess suited to receiving adhesive. The shape of the cell corresponds to that of the accumulator, with a clearance enabling the placing of the accumulator and the passage of the adhesive, as will be seen below.

It is only after the placing of the accumulators in the end plate that the adhesive is injected. The injection of adhesive being carried out in an orifice of the end plate distant from each cell and connected to a recess via a supply channel, the circulation of the adhesive in the end plate is controlled and in particular does not risk causing pollution of the zones of electrical contact of the accumulators.

The arrangement of the cells is advantageously chosen as a function of the shape of the accumulators (which may notably be cylindrical or prismatic) to minimise the distance between adjacent cells, which also has the effect of minimising the bulk of the end plate. Thus, for example, for cylindrical accumulators, the cells will advantageously be arranged in a staggered manner; for prismatic accumulators, the cells will advantageously be arranged in lines and columns. However, those skilled in the art could choose any other arrangement of the cells as a function of the shape of the accumulators and the adhesive circuit within the end plate.

Although the assembly method can be implemented manually, it is advantageously implemented in an entirely automated manner.

Figure 10:
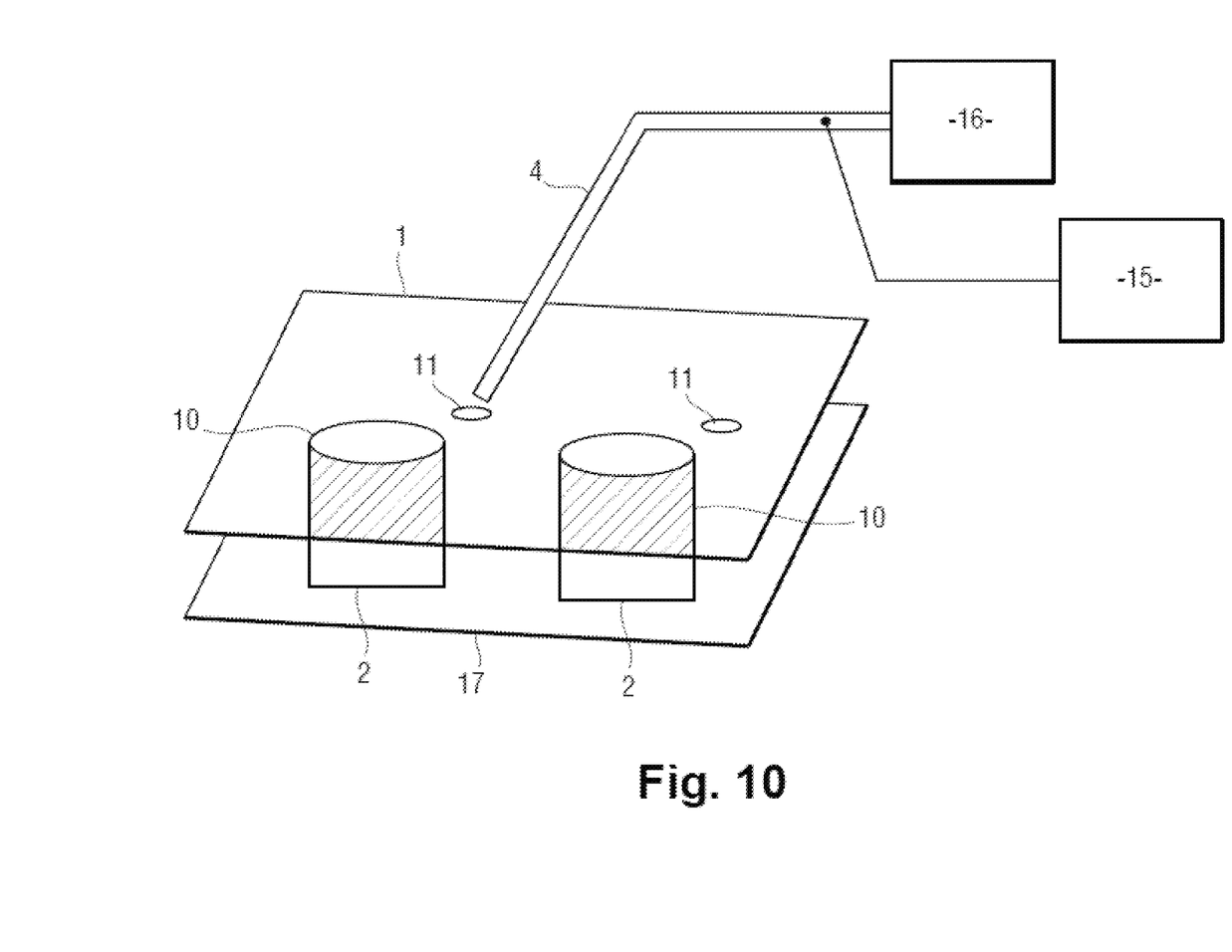
FIG. 10 illustrates the adhesive injection cannula connected to an adhesive injection pump.

The machine enabling the implementation of the bonding is known in itself and thus will not be described in detail here. It will simply be indicated that it comprises an adhesive tank, a metering pump in fluidic communication with the tank, an adhesive injection cannula connected to the pump 15 by a tubing, and a robot 16 suited to displacing the cannula along three axes. The pump 15 and the robot 16 are illustrated in FIG. 10.

The adhesive employed is essentially chosen as a function of the materials of the end plate and the accumulator, in order to have sufficient compatibility with said materials to respect the mechanical strength specification. In general, this specification comprises requirements in terms of vibration resistance, in the range of temperature of use of the battery. The expected tractive strength is typically of the order of several hundred Newtons.

The end plate essentially has a mechanical support function for the accumulators. It may be made of plastic material (for example polypropylene, polyetherimide (PEI), polyetheretherketone (PEEK), acrylonitrile butadiene styrene (ABS) (non-limiting list)) or made of metal (for example aluminium, steel, copper, magnesium (non-limiting list)). The end plate may be manufactured by injection in a mould, or by machining of a block of a suitable material, or instead by an additive manufacturing technique (also called 3D printing).

According to an embodiment, the accumulators are bare, that is to say that the outer surface of the accumulator is constituted of the rigid shell which encapsulates the elements of the cell. This shell may be made of steel with or without nickel plating, aluminium or plastic. In this case, the adhesive must thus be compatible with the material of the end plate and that of the shell of the accumulator.

According to another embodiment, the accumulators are surrounded by an electrically insulating sheath, generally made of a plastic material such as polypropylene, polyvinyl chloride (PVC), polyolefin, polytetrafluoroethylene (PTFE) (non-limiting list). In this case, the adhesive must be compatible with the material of the end plate and that of the sheath. It has however been noted during vibration strength tests that the weakest element of the assembly is the sheath itself and not the adhesive. Thus, for example, tests have shown a tractive strength of the adhesive of the order of 200N, before rupture of the sheath.

One skilled in the art is able to choose, from among the adhesives available on the market and the possible materials for the end plate, a combination of an end plate, an adhesive and an accumulator (optionally provided with a sheath) which has the desired mechanical strength.

As an example which is in no way limiting, the adhesive may be an epoxy adhesive or a vinyl adhesive.

The viscosity of the adhesive is advantageously chosen as a function of the clearance available between the accumulator and the inner wall of the cell. In general, the smaller this clearance, the lower the viscosity of the adhesive may be. Conversely, the greater this clearance, the higher the viscosity of the adhesive may be.

As a non-limiting example, it has been noted that an adhesive having a dynamic viscosity of 190 Pa·s at 20° C. is well suited for a clearance of 0.05 mm to 0.7 mm between the accumulator and the inner wall of the cell. In the present text, the clearance is taken to mean the distance between the outer surface of the accumulator and the inner wall of the cell.

For the implementation of the bonding, the end plate is placed in horizontal position, that is to say that its two main faces extend in a horizontal plane (the term "horizontal" being taken to mean in the present text parallel to the ground of the building in which the method is implemented). The accumulators are for their part in vertical position.

Advantageously (not illustrated) the accumulators are aligned in a horizontal plane by a suitable alignment tool 17, such as a flat plate against which an end face of the accumulators comes to bear. An alignment tool 17 is represented in FIG. 10.

This alignment notably enables good quality of the soldering of the current collectors intended to electrically connect the poles of different accumulators.

The accumulators may be aligned in a horizontal plane thanks to a flat plate (not illustrated) arranged above the end plate and thrust means exerting a vertical thrust upwards under each accumulator to place in contact the upper face of each accumulator against the plate.

Alternatively, the accumulators may be aligned in a horizontal plane by resting by gravity on a flat plate arranged below the end plate (the thrust means mentioned below are then not necessary).

In the different embodiments illustrated, the adhesive is injected by the top of the end plate, the cannula being oriented substantially vertically. However, the effect of gravity is not very important in the circulation of the adhesive from the injection orifice up to the recess in the wall of each cell, such that the adhesive may also be injected through the bottom of the end plate.

When the injection of adhesive is carried out on the same side as the flat plate intended to align the accumulators, said plate has openings facing the injection orifices of the end plate for the passage of the cannula. However, the injection of adhesive may also be carried out on the side opposite to the flat plate.

Once all the accumulators are in place in the end plate, the robot of the bonding machine successively brings the cannula to face each injection orifice of the end plate. A suitable dose of adhesive is then injected into the corresponding orifice and flows into the supply channel(s) to fill a recess of one or more cells.

The adhesive hardens in a time of the order of several minutes to several days depending on the nature of the adhesive, preferably 24 h for an epoxy adhesive.

The end plate provided with the accumulators may next be used in other steps of assembly of the battery, notably the soldering of current collectors to electrically connect the accumulators.

Figure 1:
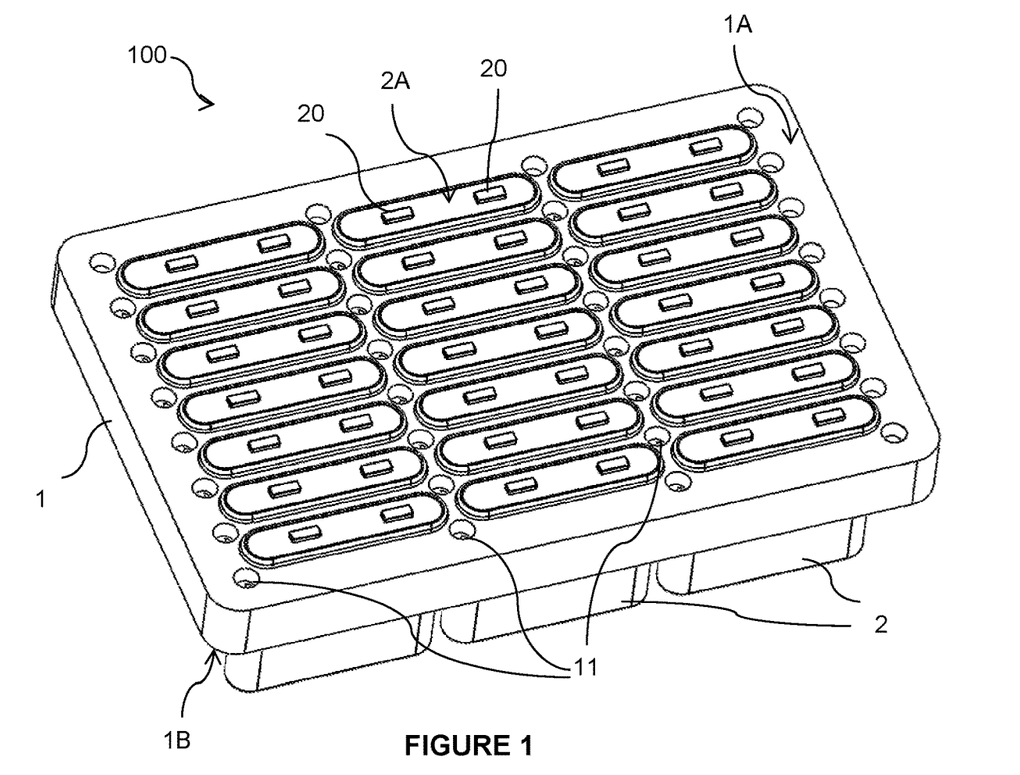
FIG. 1 is a perspective view of a battery in the course of assembly according to an embodiment wherein the accumulators are of prismatic shape and are arranged according to lines and columns.

FIG. 1 is a perspective view of a battery in the course of assembly.

Said battery 100 comprises an end plate 1 and a plurality of accumulators 2 which, in the embodiment illustrated, are of prismatic shape.

The end plate has an upper face 1A and a lower face 1B which each extend into a plane parallel to the other.

Each accumulator has two electrical poles 20 on a same face (here, the upper face 2A) of the accumulator. The accumulators are aligned with respect to each other in the vertical direction such that the upper face 2A of all the accumulators is in a same plane, parallel to the upper face 1A of the end plate.

The accumulators are each arranged in a through cell 10 (better visible in FIG. 2) of the end plate 1, according to lines and columns. A compact arrangement of the accumulators is thus obtained, according to which the distance between adjacent accumulators is minimised. Typically, the distance between adjacent accumulators is of the order of several millimetres.

The end plate 1 furthermore comprises a plurality of adhesive injection orifices 11.

Preferably, each orifice 11 has a circular section, which corresponds to the section of the cannula through which the adhesive is injected.

In a particularly advantageous manner, each cell is surrounded by four orifices 11.

Figure 2:
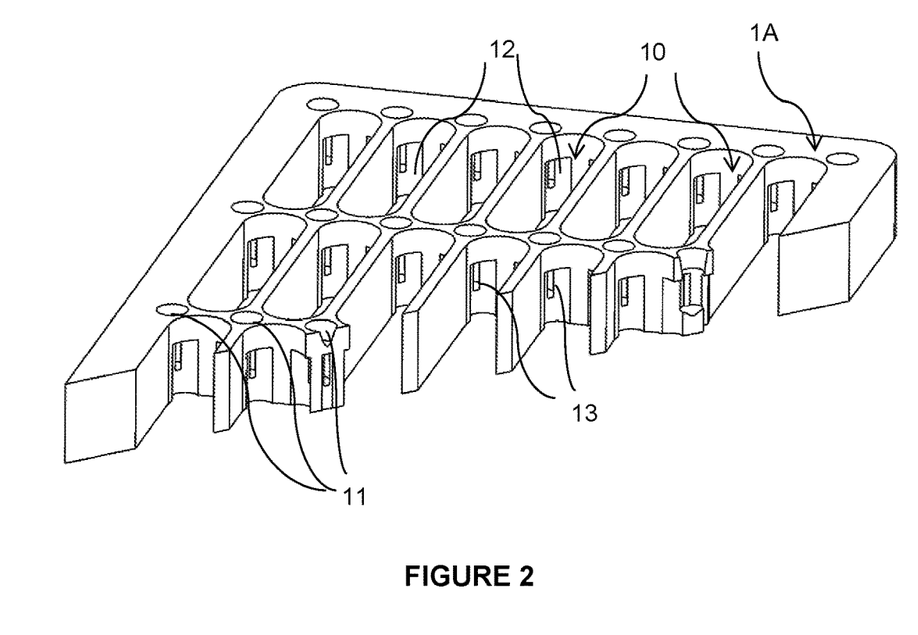
FIG. 2 is a partial sectional view of an end plate according to an embodiment of the invention.
Figure 3A:
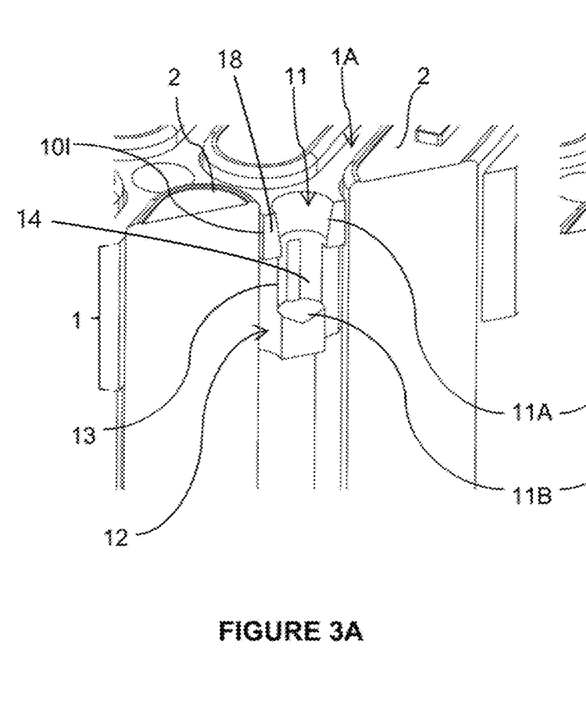
FIGS. 3A and 3B are partial sectional views at the level of an adhesive injection orifice, respectively before and after injection of the adhesive.
Figure 3B:
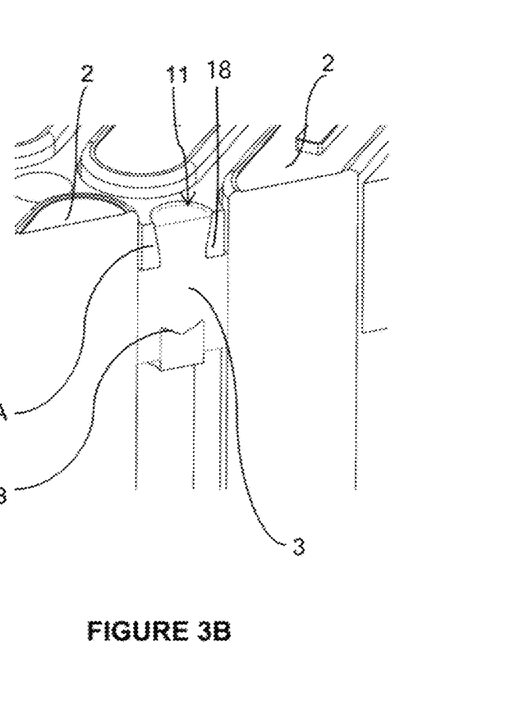

FIG. 2 is a perspective view of the end plate of FIG. 1, without the accumulators, and FIGS. 3A and 3B are partial sectional views at the level of an adhesive injection orifice of the battery of FIG. 1, respectively before and after injection of the adhesive 3.

Each orifice 11 is separated from a through cell 10 by a partition wall 18. The partition wall 18 extends from the upper face 1A towards the lower face 1B.

Each cell 10 comprises a recess 12 in its inner wall 101 which is in fluidic communication with a respective injection orifice 11.

Figure 9:
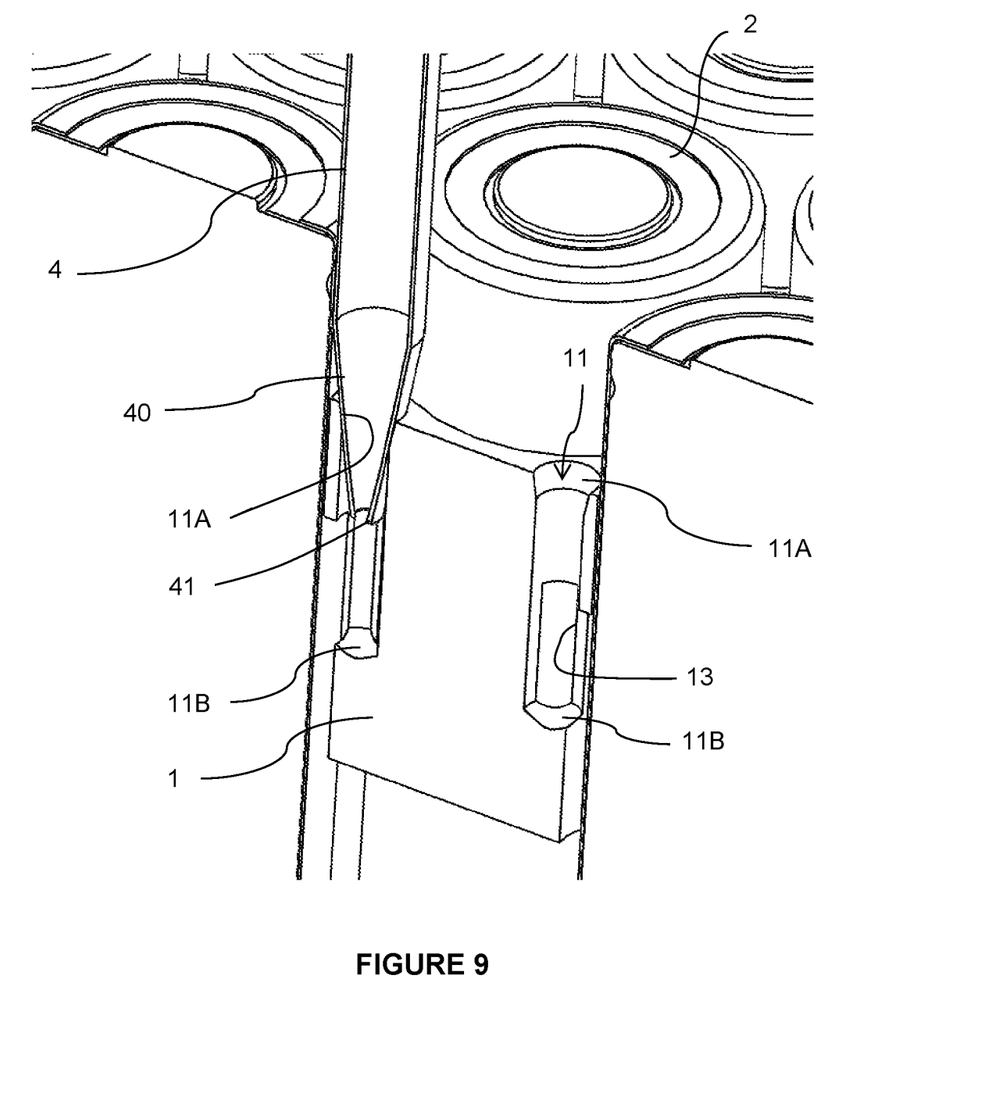
FIG. 9 illustrates the adhesive injection cannula in position in an injection orifice of the end plate.

The injection orifice 11 has an input portion 11A intended to receive the end piece of the cannula, as is represented in FIG. 9. In a particularly advantageous manner, said input portion 11A is chamfered, which makes it possible to guide the insertion of the end piece of the cannula into the orifice, in the case where it is not positioned by the robot exactly facing the orifice 11. Furthermore, this chamfered input portion 11A makes it possible to ensure a leak tight connection with the end piece of the cannula, which is advantageously conical.

The adhesive is injected into the orifice through the cannula 4 connected to an adhesive injection pump 15, as is represented in FIG. 10.

The end 11B of the injection orifice opposite to the input portion 11A is blind, in order to avoid that the adhesive flows directly through the end plate.

Furthermore, the injection orifice 11 comprises, in its side wall, a window 13 which emerges in a recess 12 of a cell. In the embodiments illustrated, each recess has an arc or circle shape which is substantially tangential to the orifice. In this case, the adhesive injected into the orifice 11 penetrates directly into each recess 12 through the respective window 13. The supply channel 14 may thus be considered as the cylindrical part of the orifice 11, over the height of the window 13. It is however possible that the recess is at a certain distance from the orifice, such that the supply channel 14 further has a conduit extending from the window 13 up to the recess. Care will however be taken to minimise the total length of the supply channel so as not to generate a too important head loss on the path of the adhesive.

The section of the recess may be chosen by those skilled in the art, notably as a function of the method for manufacturing the end plate. Thus, when the end plate is manufactured by machining, a section of a portion of circle shape is particularly advantageous since it corresponds to the passage of a drill of same diameter in a direction perpendicular to the main faces of the end plate. In the case where the end plate is manufactured by injection of plastic material or by additive manufacturing, those skilled in the art may choose any shape that may be produced with the chosen technique.

The width of the recess and the height of the recess substantially define the contact surface between the adhesive and the accumulator. This surface is chosen sufficiently large to ensure good mechanical strength of the accumulator in the end plate, for example a surface of 5 mm×14 mm=70 mm² per channel suffices to obtain a mechanical strength of the epoxy adhesive greater than that of the sheath.

Each recess 12 is delimited, towards the top, by a radial wall which extends from the inner wall 101 of the cell. Conversely, towards the bottom, the recess is not delimited, such that the adhesive may potentially flow towards the lower face of the end plate, along the accumulator. However, it is possible of limit such a flow by adjusting the dose of adhesive injected and its viscosity. This absence of delimitation of the recess downwards is dictated notably by the manufacturing constraints of the end plate (possibility of demoulding when it is manufactured by injection of plastic material, or passage of a drill when it is manufactured by machining). Another advantage of this absence of delimitation is that the air present in the cell and expelled by the adhesive may be evacuated easily downwards.

It will also be noted that a clearance, of several hundreds to several tens of millimetres, is advantageously made between the wall 101 of the cell and the outer surface of the accumulator. This clearance makes it possible to absorb potential dimensional variations of the accumulators, but also to procure a passage upwards for evacuating the air expelled by the adhesive. Conversely, given the dimensions of this passage and the viscosity of the adhesive, the adhesive is not liable to flow upwards.

Thanks to these arrangements, any trapping of air between the adhesive and the end plate or the accumulator is avoided. Consequently, even when the battery is subjected to important pressure variations, which is the case for example when it is on board a satellite, where the release of the satellite in space causing a sudden pressure drop, the bonding zone does not contain any bubble from which air could escape suddenly. The bonding strength is thus particularly reliable.

Figure 5:
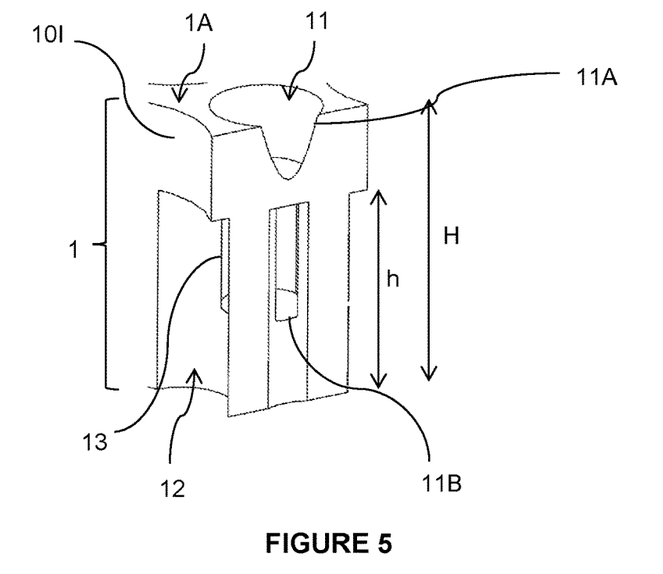
FIG. 5 is a partial sectional view of an end plate at the level of an adhesive injection orifice supplying several cells.
Figure 6:
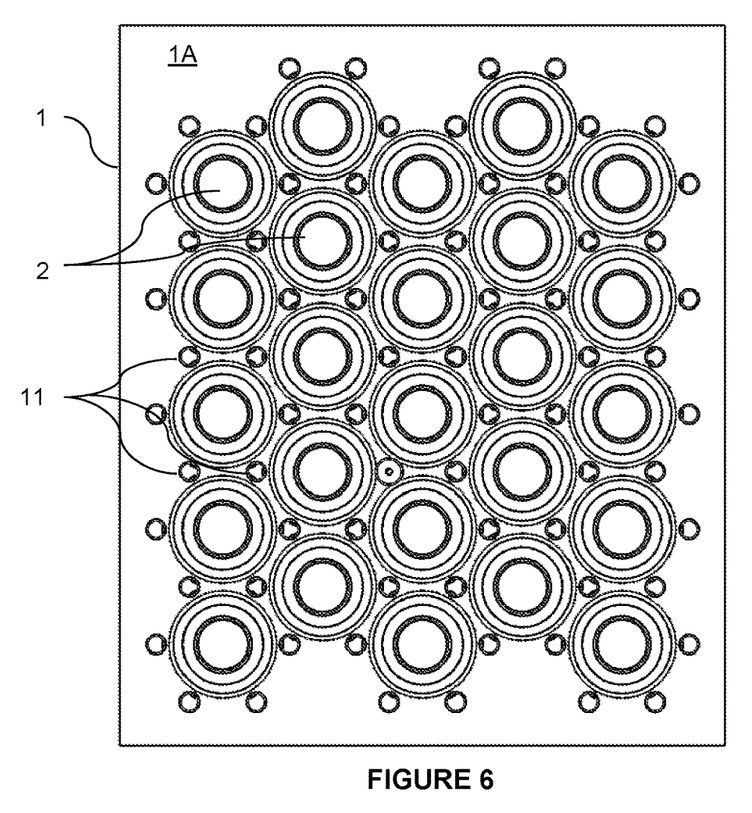
FIG. 6 is a top view of a battery according to an embodiment of the invention wherein the accumulators are of cylindrical shape and are arranged in a staggered manner.
Figure 7:
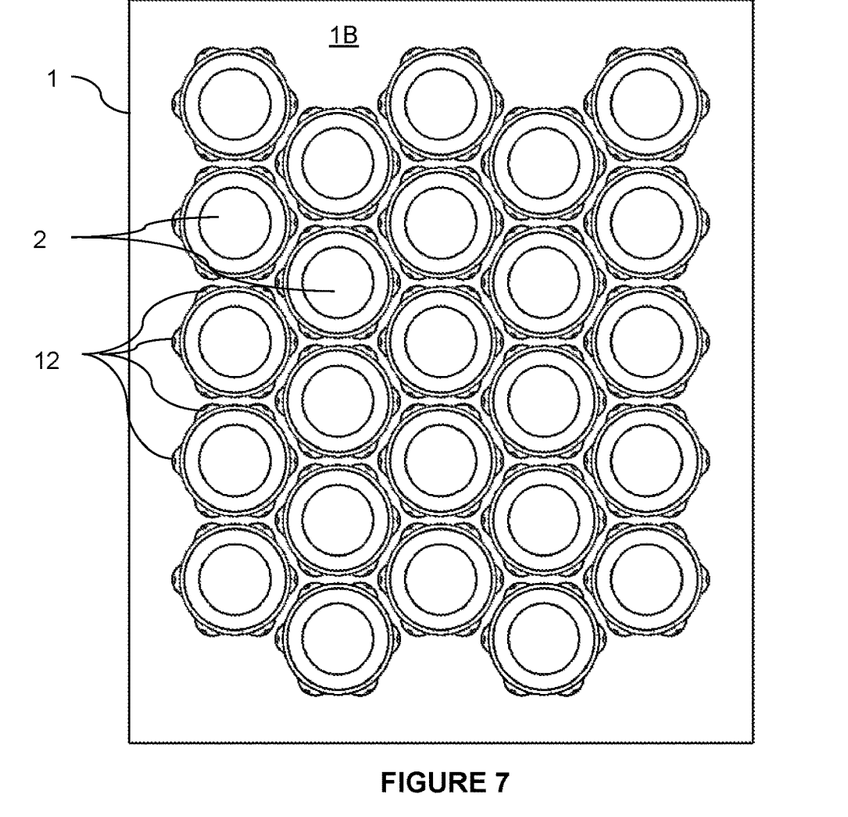
FIG. 7 is a bottom view of the battery of FIG. 6.

As illustrated in FIG. 5, the height h of the recess 12 of each cell is less than the height H of the end plate. The difference between H and h is advantageously chosen sufficiently large to avoid any overflow of adhesive by the top of the cell. For example, for an accumulator of 18 mm diameter, it is considered that the difference H-h must be greater than or equal to 4 mm. Those skilled in the art are able to adjust the dimensions of the recess and the clearance as a function of the manufacturing dimensional tolerances of the accumulators and the viscosity of the adhesive used.

It is here specified that, although the representation of the cells and the injection orifice in FIGS. 2-5 is associated with an end plate comprising cells for receiving prismatic accumulators arranged in lines and columns, the teaching concerning the design of the recesses, injection orifices and supply channels is transposable to any other type of accumulator and arrangement of cells in the end plate.

In the arrangement of the end plate illustrated in FIGS. 1-5, each injection orifice 11 is, according to its emplacement, situated in the vicinity of one, two or four cells. Furthermore, each cell comprises a recess facing each adjacent injection orifice, connected to said orifice via a respective supply channel. The injection orifice thus comprises as many side windows 13 as recesses of cells to supply.

Consequently, an orifice may enable the injection of adhesive into one or more cells, which minimises the number of steps of injection of adhesive to bond together all of the accumulators. As a function of the number of recesses to supply, the dose of adhesive injected may be adapted. The pump may thus be programmed as a function of the design of the end plate so that, as a function of the injection orifice into which the cannula is inserted, the dose of adhesive is sufficient to fill each recess supplied by said orifice.

Moreover, the accumulator is fixed in each cell through several distinct bonding zones. This makes it possible to reinforce the mechanical strength of the accumulator by spreading out the stresses undergone, but also to ensure a certain redundancy such that, even if an injection orifice does not receive adhesive, the strength of the accumulator through other bonding zones is sufficient to respect the specifications.

Figure 4:
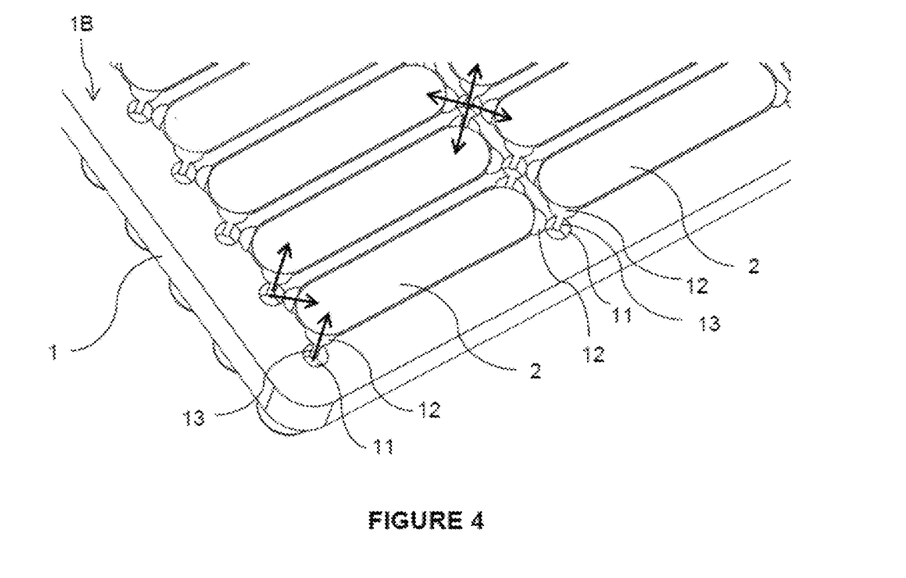
FIG. 4 is a sectional view in a plane parallel to the main faces of the end plate, in which is shown schematically the supply with adhesive according to the emplacement of the injection orifice.

As may be seen in FIG. 4, according to the emplacement of each adhesive injection orifice, this may supply a recess of one, two or four cells. The circulation of adhesive in each of these cases is shown schematically by the arrows but these have been represented longer than the supply channels uniquely for reasons of legibility of the figure.

The fact of supplying several recesses from a single recess may however only be technically envisaged if the distance to cover by the adhesive along the supply channels is sufficiently short, that is to say of the order of 3 to 5 mm at the most. Indeed, in the opposite case, there exists a risk that the head loss suffered by the adhesive prevents correct filling of each recess. Consequently, in the case where it is not possible to place an injection orifice at a distance sufficiently close to two cells or more, it will be preferable to supply a recess of each cell with a dedicated injection orifice.

FIGS. 6-9 illustrate another mode for arranging the accumulators, wherein the accumulators are cylindrical and are arranged in a staggered manner.

In this case, the cells each comprise six recesses 12 in their inner wall and are surrounded by six adhesive injection orifices 11 regularly distributed around each cell, each recess being supplied with adhesive via a respective injection orifice. Each accumulator is thus fixed to the end plate by six bonding zones. It will be noted that these six zones may have a total surface greater than the surface that would be strictly necessary to comply with the bonding mechanical strength specification, but they ensure a certain redundancy in the case of insufficient filling of one of the recesses and/or failure of one of the bonding zones.

Furthermore, when an injection orifice is situated between two or three cells, it is placed at equal distance from the recess provided in each of said cells. Thus, the length of the supply channel is identical for each cell, which ensures balanced filling of all of the recesses.

The design of the injection orifices, recesses and supply channels is similar to that described previously and thus will not be repeated.

Figure 8:
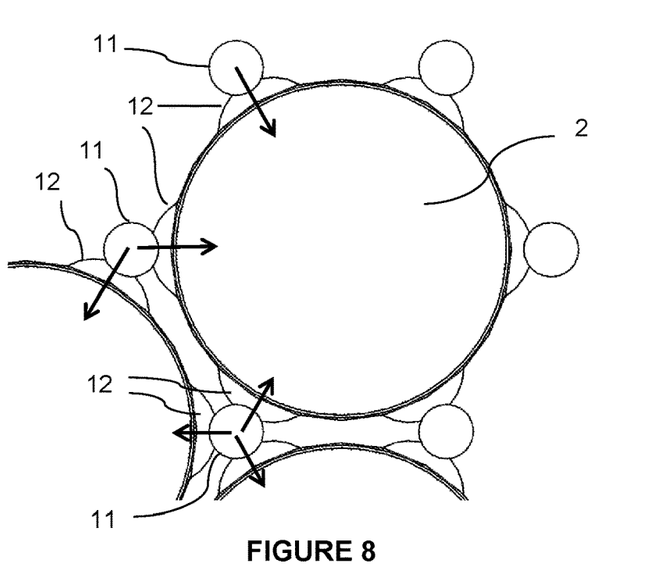
FIG. 8 is a bottom view of an end plate at the level of a cell situated on the periphery of the end plate.

As may be seen in FIG. 8, according to the emplacement of each adhesive injection orifice, said orifice can supply a recess of one, two or three cells. The circulation of adhesive is shown schematically by the arrows in each of these cases but these have been represented longer than the supply channels uniquely for reasons of legibility of the figure.

FIG. 9 illustrates the placing of the cannula in an injection orifice of the end plate.

The cannula 4 has a lengthened shape of circular section, of the order of several millimetres diameter, with a tip 40 of truncated cone shape narrowing towards the adhesive outlet end 41.

The cannula 4 is typically made of plastic material and hence has a certain flexibility.

Consequently, even if the robot (not represented) does not position the cannula exactly facing the injection orifice 11, the end piece 40 and the chamfered input portion 11A cooperate to enable the cannula to centre itself in the orifice 11.

Furthermore, the surfaces of the end piece 40 and the input portion 11A are in mutual contact and ensure leak tightness of the end plate vis-à-vis the cannula. Thus, the risks of the adhesive rising through the input portion 11A are eliminated.

The end piece 40 and the input portion 11A also ensure a limitation of the penetration depth of the cannula into the injection orifice. The end piece 40 and the input portion 11A are advantageously dimensioned so that, when the cannula is in position in the orifice, the end 41 of the cannula is located above the window 13 or at the level of the upper edge of said window, in order to enable a flow of the adhesive over the whole height of the window 13.

The invention that has been described thus has a certain number of advantages.

On the one hand, the overall structure of the battery is relatively light. Even if the end plate procures an additional mass compared to a direct assembly of the accumulators with each other, it is lighter than an assembly of screwed end plates such as known from the prior art.

Furthermore, the design of the end plate has additional advantages compared to known solutions.

Indeed, it lends itself to easy automation of the bonding method. The labour cost is thus low, which makes it possible to manufacture the battery at a reduced cost.

On the other hand, it procures great reliability of the mechanical strength of the accumulators, since each accumulator is fixed to the end plate by several bonding zones (for example four in the case of prismatic accumulators, or six in the case of cylindrical accumulators, those skilled in the art being able to choose another number as a function of the geometry of the accumulators). Consequently, in the event of failure of one bonding zone, the other zones maintain the fixation of the accumulator in the end plate.

Finally, this design makes it possible to avoid trapping air in the bonding zone that holds each accumulator. This advantage is significant for batteries intended to be used in a vacuum (space applications for example) because there is no risk of degradation of the bonding zone due to the escape of air under vacuum.

The invention claimed is:

1. A method for assembling a battery, comprising:
providing an end plate comprising a through cell for an accumulator and an injection orifice distant from the through cell, the end plate comprising a partition wall that separates the injection orifice from the through cell, the injection orifice being in fluidic communication via a supply channel with a recess of an inner wall of the through cell,
placing the accumulator in the through cell,
injecting adhesive through the injection orifice, the adhesive flowing in the supply channel up to the recess, the accumulator being bonded to the end plate by the adhesive contained in said recess.

2. The method according to claim 1, wherein the adhesive is injected into the injection orifice through a nozzle connected to an adhesive injection pump.

3. The method according to claim 2, wherein the adhesive injection pump is controlled to inject a determined dose of adhesive into the injection orifice.

4. The method according to claim 2, wherein the nozzle is actuated by a robot.

5. The method according to claim 2, wherein the nozzle has a conical tip and the injection orifice has a chamfered input portion able to guide an insertion of an end piece of the nozzle into the injection orifice.

6. The method according to claim 5, wherein dimensions of the injection orifice and dimensions of the nozzle are chosen to ensure leak tightness between the nozzle and the injection orifice when the end piece is inserted into the injection orifice.

7. The method according to claim 1, wherein a clearance is arranged between the accumulator and the inner wall of the through cell so as to ensure fluidic communication of the recess with an exterior of each side of the end plate, to enable evacuation of air expelled by the adhesive during injection.

8. The method according to claim 1, wherein the through cell is a first through cell, the injection orifice is a first injection orifice, the end plate comprises a plurality of through cells including the first through cell, the end plate comprises a plurality of injection orifices including the first injection orifice, each through cell of the plurality of through cells comprises at least two recesses, each recess being connected via a respective supply channel to a respective injection orifice comprised in the plurality of injection orifices, such that each accumulator is bonded to the end plate through the adhesive contained in each of the recesses.

9. The method according to claim 1, wherein the through cell is a first through cell and the end plate comprises two adjacent through cells including the first through cell, the method comprising the bonding of at least two accumulators in the end plate in the two adjacent through cells, the injection orifice being in fluidic communication with a recess in the inner wall of each of the two adjacent through cells via a respective supply channel, such that during the injection of the adhesive into the injection orifice, the adhesive flows into each supply channel up to a respective recess.

10. The method according to claim 9, wherein a dose of adhesive injected into the injection orifice is adjusted as a function of a number of supply channels supplied by the injection orifice.

11. The method according to claim 9, wherein, during the injection of the adhesive, ends of the accumulators are aligned by an alignment tool on one side of the end plate.

\* \* \* \* \*